United States Patent
Marinier et al.

(10) Patent No.: US 11,524,745 B2
(45) Date of Patent: Dec. 13, 2022

(54) PEDAL FOR A CYCLE

(71) Applicant: SRAM, LLC, Chicago, IL (US)

(72) Inventors: Benjamin Marinier, Corenc (FR);
Julien Limanton, Voiron (FR)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 17/206,360

(22) Filed: Mar. 19, 2021

(65) Prior Publication Data

US 2021/0316816 A1 Oct. 14, 2021

(30) Foreign Application Priority Data

Mar. 20, 2020 (FR) ...................................... 2002762

(51) Int. Cl.
*B62M 3/08* (2006.01)

(52) U.S. Cl.
CPC ...................................... *B62M 3/08* (2013.01)

(58) Field of Classification Search
CPC ....................................................... B62M 3/08
See application file for complete search history.

(56) References Cited

U.S. PATENT DOCUMENTS

| 402,926 A | 5/1889 | Haynes, Jr. | |
| 6,647,826 B2 * | 11/2003 | Okajima | B62M 3/08 |
| | | | 74/563 |
| 2014/0251077 A1 | 9/2014 | Chen | |
| 2015/0122078 A1 * | 5/2015 | Chen | B62M 3/08 |
| | | | 74/594.4 |

FOREIGN PATENT DOCUMENTS

| CN | 202827972 | * | 3/2013 | |
| CN | 204173124 | | 2/2015 | |
| CN | 206255148 | | 6/2017 | |
| DE | 202013004398 U1 | * | 5/2013 | ............. B62M 3/08 |
| SU | 889518 | | 2/1980 | |
| TW | M420483 | | 1/2012 | |

OTHER PUBLICATIONS

TranslationDE202013004398.*
TranslationCN202827972.*
Retrieved from the internet (Jan. 2022) : https://rideissi.com/pedals/ thump published Jan. 2019.*

* cited by examiner

*Primary Examiner* — Vicky A Johnson

(57) ABSTRACT

A bicycle pedal comprising an openwork body which comprises a front longitudinal wall, a rear longitudinal wall, and a central shaft having a transverse channel configured to receive a spindle fixed to a crank arm. The central shaft provides a connection between an outer side wall and an inner side wall located on the side of the crank arm. The body rotatably mounted about the spindle by at least one bearing. The central shaft extends outwardly toward the outside by two diverging arms delimiting between them a lateral recess provided in the body facing the channel.

15 Claims, 4 Drawing Sheets

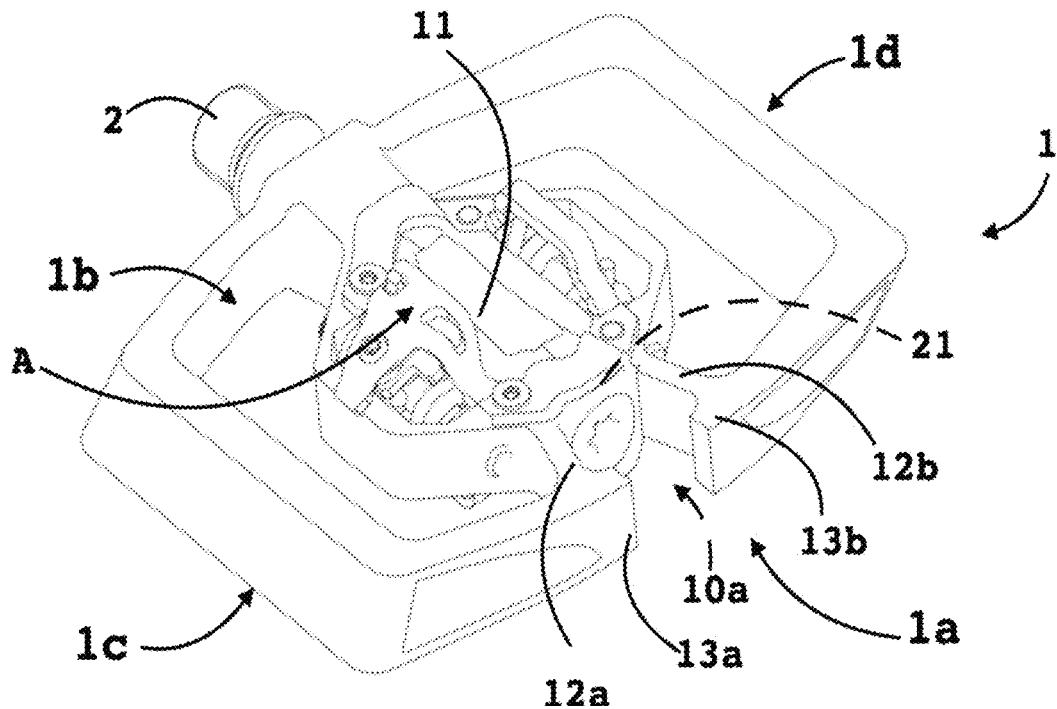

PEDAL FOR A CYCLE

PRIORITY

This application claims priority to, and/or the benefit of, French patent application FR2002762, filed on Mar. 20, 2020, the contents of which are included by reference herein in its entirety.

FIELD OF THE DISCLOSURE

The invention applies to the field of cycles. In particular, the invention relates to a cycle pedal and, notably, to a pedal intended for all-terrain bicycles known as mountain bikes.

BACKGROUND

Many cycles are equipped with pedals comprising an openwork body rotatably mounted on a bearing axle housed in a central channel of the pedal body. The bearing axle is then mounted on a crank arm. Some pedals have enlarged sides with a slight concavity that is adapted to the profile of the arch of the foot. At least one of these sides is provided with reliefs to facilitate the attachment and retention of the cyclist's shoe.

Such a pedal is described, inter alia, in patent application US 2014/0251077. The body of this pedal has a projecting side portion provided with an opening located in the elongation of the central channel of the pedal body. The opening is used to insert the fastening members of the bearing axle, providing the rotary connection with the pedal body. However, access to these members through this opening remains difficult.

Since mountain bikes are designed to be ridden in a natural environment, they are likely to encounter numerous obstacles on the ground and come into contact with debris (gravel, grass, leaves, branches, etc.) that may get caught in the pedals and hinder their rotation. This risk of jamming is all the more important when the pedal body is openwork and has a narrow side opening in a projecting portion, as is the case in the existing embodiments.

Patent CN 2062551480 describes a pedal with an axle provided with a single ball bearing of reduced size, which allows the thickness of the body to be reduced but which is clearly insufficient for correctly transmitting mechanical forces.

However, although the trend is toward lighter cycle pedals, and in particular mountain bike pedals, achieving this objective, which includes a reduction in thickness and an increase in open areas, must not compromise the rigidity or mechanical strength of the structure.

SUMMARY

In this context, the present disclosure aims to propose a cycle pedal that allows the technical problems posed by the prior art to be solved by facilitating the access to the axle fastening members while offering a thinner and lighter structure without altering its the rigidity and contributing to a better distribution of force.

This purpose may be achieved, according to the present disclosure, by a cycle pedal comprising an openwork body which comprises a front longitudinal wall, a rear longitudinal wall, and a central shaft comprising a transverse channel configured to receive a spindle fixed to a crank arm. The central shaft providing a connection between an outer side wall and an inner side wall located closest to the crank arm. The openwork body mounted rotatably about the spindle by at least one bearing. The central shaft has two divergent arms extending outwardly toward the outer side wall. The two divergent arms delimiting therebetween a lateral recess provided in the openwork body facing the channel.

According to an embodiment, the divergent arms may have at their respective ends, longitudinal lugs whose outer edges extend toward each other, providing an opening of the recess to the exterior of the body.

According to an embodiment, the outer edges of the lugs are beveled and parallel to each other.

Preferably, these beveled outer edges have an inclination downward and toward the rear of the body of between 4° and 35° with respect to an axis perpendicular to the plane of the body.

According to an embodiment, the lugs are convergent and extend in the elongation of the outer side wall of the body.

According to an embodiment, the body comprises two independent wings, respectively, front and rear, separated by the central shaft.

Preferably, the body has a length of between 100 mm and 120 mm and a width of between 90 mm and 110 mm.

According to an embodiment, the lateral recess of the body has a substantially quadrilateral profile delimited, respectively, by the two arms and the distal face of the shaft.

In another embodiment, the two arms extend in planes perpendicular to the body and diverge at an angle of between 10° and 45° relative to the axis of the channel.

According to an embodiment, the upper and lower sides of the body have a concave profile.

According to an embodiment, the outer and inner side walls of the body are provided with cavities.

According to an embodiment, the inner and outer side walls of the body are provided with through cavities.

According to an embodiment, the spindle is rotatably connected to the body by a double ball bearing.

Preferably, this double ball bearing is mounted near the outer end of the channel.

According to yet another embodiment, the central shaft has a parallelepipedal cross-section and has on at least one of its upper and lower sides, means for automatically attaching a shoe.

The pedal of the present disclosure comprises a body with large, openwork parts, which leads to a significantly lighter structure. Due to the profile and specific orientation of the reinforcement arms, this lightening does not compromise the overall rigidity and proper mechanical strength and is compatible with the concave profile of the upper and lower sides, which is adapted to the arch of the foot. The pedal of the present disclosure thus offers a good compromise between rigidity and lightness.

The lateral recess in the pedal body is not closed, which prevents objects or debris from getting caught in the pedal. In effect, the beveled edges of the lugs facilitate the guidance and exit toward the rear of any object that may have accidentally become caught in the recess of the pedal.

In addition, the lateral recess provides easy access to the spindle and bearings and simplifies the assembly and maintenance operations of the pedal.

The body of the pedal may be formed of two independent wings, front and rear respectively, connected only by the central shaft. This specific structure allows the efforts exerted on the front and the rear of the pedal to be decoupled and the mechanical efficiency to be optimized. Due to the possible presence of a damping element, vibrations resulting from sudden forces on the pedal are also absorbed.

Finally, the pedal spindle may be equipped with two smaller bearings instead of the traditional single bearing and a thinner bearing to reduce the thickness of the pedal while maintaining good power transmission.

Other features and advantages of the present disclosure will become apparent from the following description, with reference to the attached drawings and detailed hereinafter.

BRIEF DESCRIPTION OF DRAWINGS

FIG. 4B is a perspective view of a second alternative embodiment of the enlarged pedal of the present disclosure.

FIG. 4C is a perspective view of a third alternative embodiment of the enlarged pedal of the present disclosure.

DETAILED DESCRIPTION

For greater clarity, identical or similar elements are identified by identical reference indices in the description and in the figures.

The embodiments of the pedal illustrated by the figures shown above and described below are given only as non-limiting examples. It is explicitly provided that different embodiments may be proposed and combined with each other to propose other embodiments.

The present disclosure relates to the field of bicycle equipment of all types, but is particularly suitable for mountain bikes and, in particular, for the enlarged pedals intended for this type of bicycle.

Figure 1A:
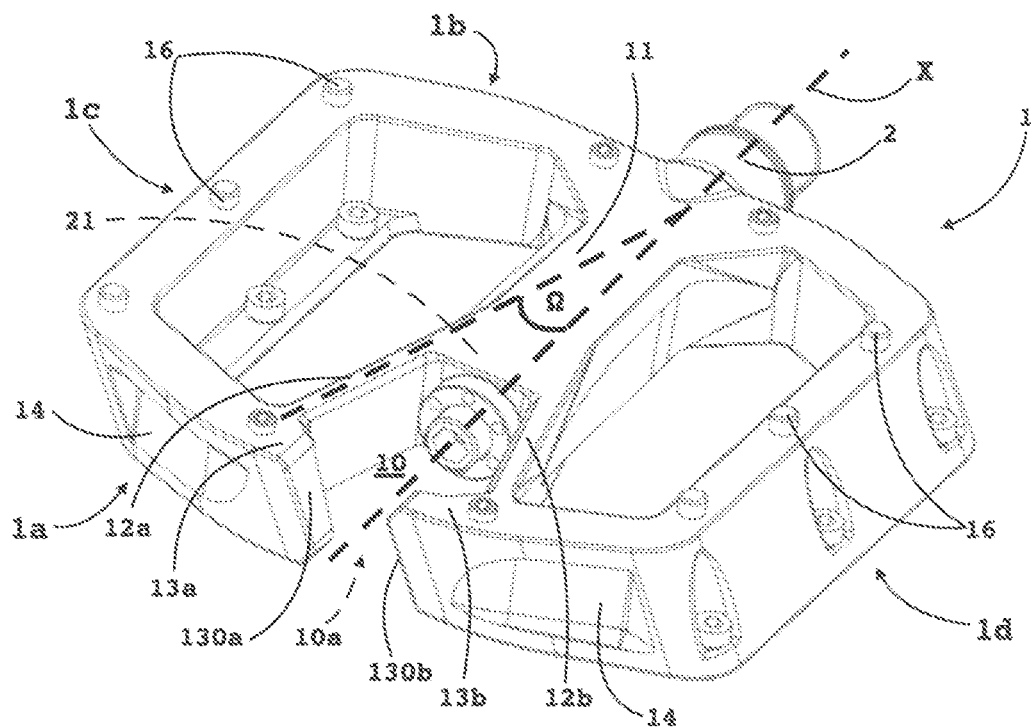
FIG. 1A is a rear perspective view of an embodiment of the enlarged left pedal of the present disclosure.
Figure 1B:
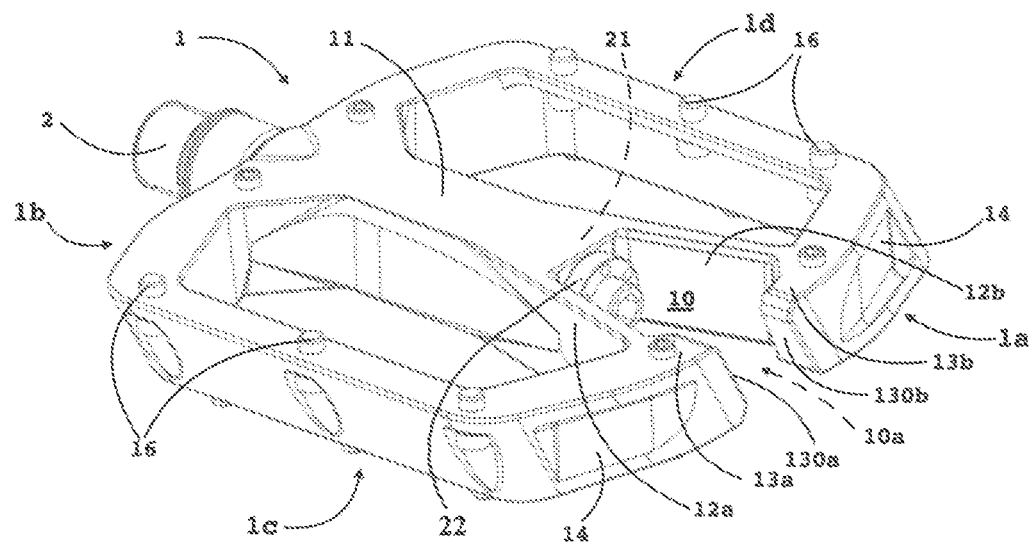
FIG. 1B is a front perspective view of the pedal in FIG. 1A.

As illustrated in FIGS. 1A and 1B which show a left-hand pedal, cycle pedals comprise an openwork body 1. This body 1 comprises a central shaft 11 providing the connection between an inner side wall 1b located on the side of the crank arm and an outer side wall 1a located on the side opposite to the inner side wall. The body 1 is also delimited by a front longitudinal wall 1c and a rear longitudinal wall 1d.

The shaft 11 has a parallelepipedal cross section. According to alternative embodiments not shown, this shaft could take other forms and have, in particular, a circular or curvilinear cross-sectional profile.

The shaft 11 is provided with an inner channel 11a (visible in FIG. 3), extending transversely and intended to receive a spindle 2. The spindle 2 is fixed, at its proximal end and generally by screwing, to a crank arm (not shown) and connected, at its distal end, in a rotary manner to the body 1 by at least one ball bearing 21 (visible in cross-section in FIG. 3 and positioned in dotted lines in FIGS. 1A and 1B).

The upper and lower sides of the body 1 have spikes 16 to reinforce the grip of the cyclist's shoe on the pedal and prevent the sole from slipping. The upper and lower sides have a concave profile adapted to the shape of the arch of the foot.

In order to increase the support surface of the cyclist's foot and to optimize the power transmitted to the crankset, it is known to increase the surface of the pedal body 1. This increase is reflected both in a longitudinal extension toward the front and toward the rear and by a lateral extension, in the transverse direction, i.e., along the axis of the shaft 11. However, this enlargement must not weigh down the pedal, nor compromise its rigidity and its mechanical strength.

In this respect, the present disclosure proposes to elongate the central shaft 11 laterally outwards by two divergent arms, respectively, a front arm 12a and a rear arm 12b, delimiting between them a lateral recess 10 provided in the body 1 next to the outer end of the channel 11a.

The recess 10 is thus delimited here, respectively, by the two arms 12a, 12b and the distal face of the shaft 11 where the channel 11a opens. This recess 10 thus separates the body 1, into two independent and symmetrical wings, connected at the center by the shaft 11 and arranged respectively at the front and rear of this shaft 11 and with the pedal in its substantially horizontal working position. The recess 10 thus provides a free space at the outer end of the central shaft 11, the profile of which is substantially quadrilateral.

The front wing is composed of a closed contour formed by the shaft 11, the front arm 12a, the front portion of the outer side wall 1a, the front longitudinal wall 1c, and the front portion of the inner side wall 1b. The rear wing is composed of a closed contour formed by the shaft 11, the rear arm 12b, the rear portion of the outer side wall 1a, the rear longitudinal wall 1d, and the rear portion of the inner side wall 1b.

This specific structure allows the forces exerted on the front and rear of the pedal body to be decoupled, thus optimizing both mechanical efficiency and damping. Thus, a force applied to the front part of the pedal does not disturb the rear part of the pedal and vice versa.

Preferably, the ends of the arms 12a, 12b, which connect to the outer side wall 1a of the body 1, have longitudinal lugs, front 13a and rear 13b, respectively. However, it is not beyond the scope of the present disclosure for the pedal to have no lugs, the lateral recess being then as wide as possible and its width corresponding to the distance between the end of the front arm 12a and the end of the rear arm 12b.

Figure 4A:
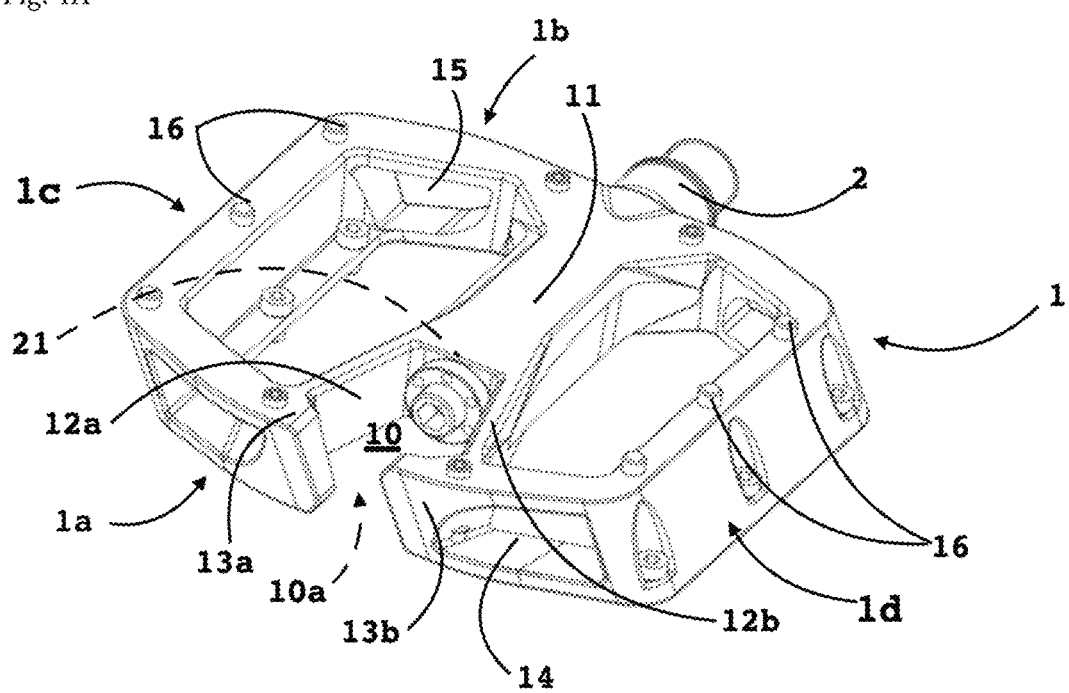
FIG. 4A is a perspective view of a first alternative embodiment of the enlarged pedal of the present disclosure.

When the lugs are present, the respective outer edges 130a, 130b of the lugs 13a, 13b extend toward each other so as to partially close the recess 10 outwardly, leaving a gap or opening 10a. The length of the lugs will be chosen so that the rigidity of the pedal in flexion is sufficient.

Where appropriate, and according to an alternative embodiment shown in FIG. 4C, the opening 10a may be filled with a damping enhancing element 17. This damping element 17 is made, for example, in the form of a strip made of elastomeric material which is permanently or removably fixed to the free edges of the lugs 13a, 13b. The element 17 works in compression and/or flexion and deforms elastically due to the force of the cyclist's foot on the front wing or the rear wing of the pedal body 1.

In the case where the damping element 17 is removable, the cyclist may replace it with another damping element of different stiffness depending on the desired mechanical behavior of the pedal. This element 17 may be interchangeable and, in the event of wear, may be replaced by an element of similar rigidity.

Figure 2A:
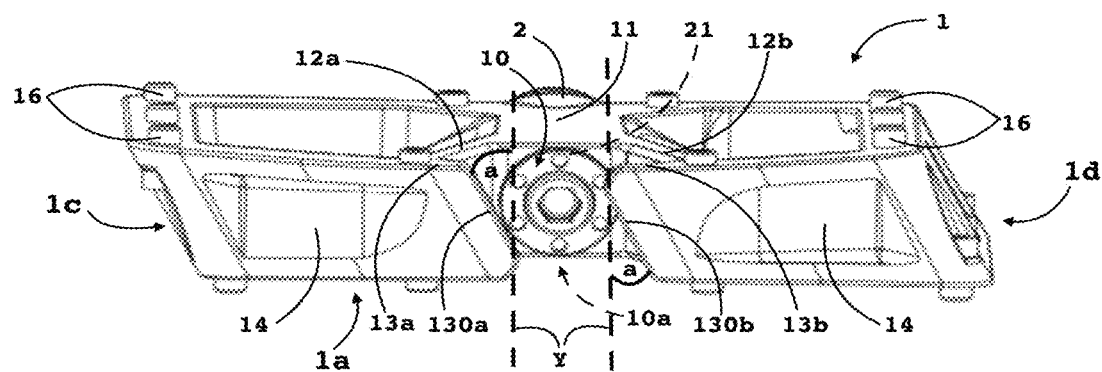
FIG. 2A is a side view of the pedal of FIGS. 1A and 1B.
Figure 2B:
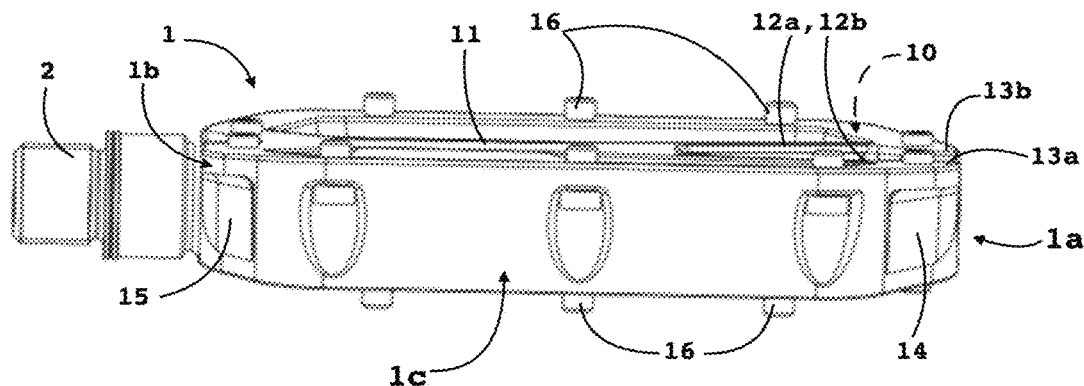
FIG. 2B is a front view of the pedal of FIGS. 1A and 1B.

According to an embodiment of the pedal illustrated in FIG. 2A, the outer edges 130a, 130b of the lugs 13a, 13b are beveled, parallel to each other and may preferably have an inclination downwards and toward the rear of the body 1. Preferably, the inclination (a) of these beveled outer edges is between 4° and 35° and preferably between 5° and 10° with respect to an axis Y perpendicular to the plane of the body 1. In another embodiment not shown, the outer edges of the lugs 13a, 13b may be parallel and vertical.

Figure 2C:
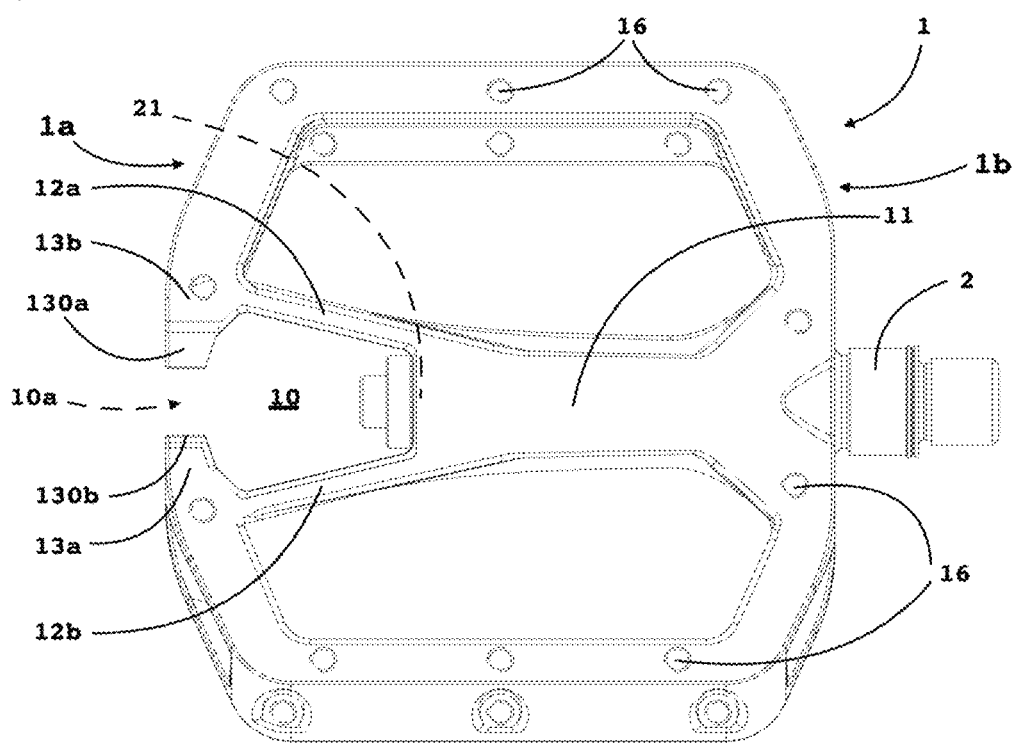
FIG. 2C is a top view of the pedal of FIGS. 1A and 1B.

The two arms 12a, 12b extend in planes perpendicular to the body 1 and diverge at an angle (Q) of between 10° and 45° and preferably between 10° and 20° relative to the common axis X of the shaft 11 and the channel 11a, as illustrated in FIGS. 1A and 2C. The orientation and dimensions of these arms are optimized to provide reinforcement for the body 1.

The lugs 13a, 13b extend in the elongation of the outer side wall 1a of the body 1. As illustrated in the figures, the lugs 13a, 13b converge toward each other without meeting and define, between their respective free edges, the opening 10a.

The smallest length of the lugs is between 4 mm and 7 mm and preferably between 5 mm and 6 mm. The greatest length of the lugs is between 9 mm and 12 mm and preferably between 10 mm and 11 mm.

The lugs 13a, 13b are oriented toward the opening 10a of the recess 10. As a result, the profile of the outer side wall 1a of the body 1 (the front and rear portions of which are slightly divergent between the front and rear wings, as illustrated in FIG. 2C) has points of inflection in the respective areas of connection with the arms 12a, 12b and the converging lugs 13a, 13b due to the relative changes in orientation.

In yet another embodiment not shown, the lugs are no longer aligned and coplanar but are oriented toward the interior of the recess 10 extending in secant planes perpendicular to the body and defining an angle therebetween.

Due to the specific beveled profile of the outer edge 130a, 130b of the lugs 13a, 13a, the present disclosure makes it possible to avoid the catching and jamming of objects or debris in the pedal by ensuring that they are guided toward the outside of the recess 10 and thus facilitating their exit as the bicycle moves forward. This guidance is also reinforced by the orientations of the outer side wall 1a on both the front and rear wings of the body 1.

In addition, the presence of the recess 10, with its axial opening 10a to the outside between the lugs 13a, 13b, allows easy access to the spindle fastening members 22 and the bearings 21, which simplifies the assembly and maintenance of the pedal.

Preferably, in order to lighten the structure of the pedal, the outer side wall 1a and the inner side wall 1b of the body 1 are provided with cavities 14, 15, respectively. According to alternative embodiments, these cavities are made either on the outer side faces of the outer side wall 1a and/or of the inner side wall 1b (as illustrated by the figures), or on the facing inner faces of these side walls 1a, 1b. It would also be possible to provide for these cavities to be made on an inner face of one of the side walls and on an outer face of the other side wall. According to still other embodiments, these cavities could also be made on the front 1c and rear 1d longitudinal walls.

It will thus be understood that, according to the present disclosure, all combinations are possible and these cavities 14, 15 may also be blind or through to further increase the lightness of the pedal structure.

Preferably, at least one of the longitudinal edges of these cavities 14, 15 is parallel to the outer edges 130a, 130b (beveled or not) of the lugs 13a, 13b, as well as the front face of the front longitudinal wall 1c and the rear face of the rear longitudinal wall 1d of the body 1, as illustrated by the embodiments shown in the figures.

The body 1 of the pedal may be made of a material such as aluminum or carbon or of a composite material or of a plastic material, possibly reinforced with natural or artificial fibers, offering the possibility of manufacture by molding in a single piece, while at the same time having satisfactory rigidity and mechanical strength. If necessary, the body 1 may also be made in two or more parts to be assembled by any conventional means.

In a preferred embodiment, the body has a length, between its front and rear ends, of between 100 mm and 120 mm and, preferably, of between 105 mm and 115 mm and a width, between the respective outer faces of the outer side wall 1a and inner side wall 1b, of between 90 mm and 110 mm and, preferably, of between 95 mm and 105 mm. As is clearly apparent in the figures, this enlarged pedal has a length greater than its width.

The thickness of the arms 12a, 12b is between 3 mm and 7 mm and preferably between 4 mm and 5 mm of 4.6 mm. The height of these arms is between 13 mm and 20 mm, preferably between 15 mm and 17 mm, while their length is between 25 mm and 30 mm, preferably between 26 mm and 28 mm.

The shaft 11 therefore has a width of between 13 mm and 20 mm and preferably between 15 mm and 17 mm and a height of between 13 mm and 20 mm and preferably between 15 mm and 17 mm. The shaft 11 has a length of between 60 mm and 80 mm and this length is between half and two thirds of the width of the pedal.

The present disclosure also aims to propose a modification of the rotary connection between the spindle 2 and the body 1 of the pedal by replacing the traditional ball bearing with a double ball bearing 21 (in dotted lines in particular in FIG. 1A, 1B and in solid lines in FIG. 3) of smaller dimensions, which makes it possible to reduce the thickness of the pedal while retaining good transmission of energy by better distribution of forces.

Figure 3:
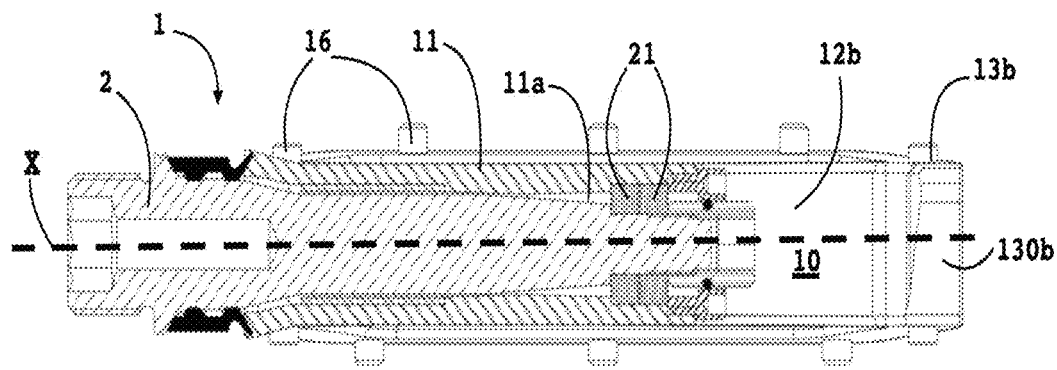
FIG. 3 is a front view in cross section of the enlarged pedal of the present disclosure.

Preferably, this double ball bearing 21 is mounted in a cage arranged near the outer end of the channel 11a, as shown in FIG. 3. The seal is provided by an outer protective cover on the outer side and by seals mounted on both sides of the channel 11a.

In another embodiment shown in FIG. 4B, the central shaft 11 has on at least one of its upper and lower sides an automatic attachment device A for a shoe, for example, for a mountain bike, as described, for example, in FR 2768391. It is possible to provide, without going beyond the scope of the present disclosure, for these automatic attachment device A to be removably mounted on the shaft 11.

What is claimed is:

1. A cycle pedal comprising an openwork body comprising a front longitudinal wall, a rear longitudinal wall, and a central shaft having a transverse channel configured to receive a spindle fixed to a crank arm, the central shaft providing a connection between an outer side wall and an inner side wall located on the side of the crank arm, the openwork body being mounted rotatably about the spindle by at least one bearing, the central shaft having two divergent arms extending outwardly toward the outer side wall, the two divergent arms delimiting therebetween a lateral recess provided in the openwork body facing the transverse channel, wherein the two divergent arms are connected to the outer side wall without meeting to provide an opening of the lateral recess toward the exterior.

2. The cycle pedal according to claim 1, wherein the divergent arms have longitudinal lugs at their respective ends, outer edges of the longitudinal lugs extending toward each other without meeting providing the opening of the lateral recess to the exterior.

3. The cycle pedal according to claim 2, wherein the outer edges of the longitudinal lugs are beveled and parallel to each other.

4. The cycle pedal according to claim 3, wherein the beveled outer edges of the longitudinal lugs have an inclination downward and toward the rear of the openwork body of between 4° and 35° with respect to an axis perpendicular to the plane of the openwork body.

5. The cycle pedal according to claim 2, wherein the lugs are convergent and extend in the elongation of the outer side wall of the openwork body.

6. The cycle pedal according to claim 2, wherein the longitudinal lugs extend in the elongation of the outer side wall of the openwork body.

7. The cycle pedal according to claim 1, wherein the openwork body comprises a front wing and a rear wing independent of each other separated by the central shaft.

8. The cycle pedal according to claim 1, wherein the openwork body has a length of between 100 mm to 120 mm and a width of between 90 mm and 110 mm.

9. The cycle pedal according to claim 1, wherein the lateral recess has a substantially quadrilateral profile delimited, respectively, by the two divergent arms and a distal face of the central shaft.

10. The cycle pedal according to claim 1, wherein the outer side wall and the inner side wall are provided with cavities.

11. The cycle pedal according to claim 10, wherein the cavities are through cavities.

12. The cycle pedal according to claim 1, wherein the spindle is rotatably connected to the openwork body by a double ball bearing.

13. The cycle pedal according to claim 12, wherein the double ball bearing is mounted near an outer end of the channel.

14. The cycle pedal according to claim 1, wherein the central shaft has on at least one upper and lower sides of the central shaft an automatic attachment device for a shoe.

15. The cycle pedal according to claim 1, wherein the two divergent arms extending in planes perpendicular to the openwork body and diverging to an angle of between 10° and 45° relative to an axis of the channel.

* * * * *